United States Patent
Mori

(10) Patent No.: US 6,339,477 B2
(45) Date of Patent: *Jan. 15, 2002

(54) DATA COMMUNICATION SYSTEM FOR HIGH-SPEED DATA TRANSMISSION AND RECEPTION OPERATIONS AND METHOD FOR DOING THE SAME

(75) Inventor: Hiromi Mori, Nagoya (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,568

(22) Filed: Oct. 14, 1997

(30) Foreign Application Priority Data

Oct. 18, 1996 (JP) ............................................. 8-276718

(51) Int. Cl.[7] ............................. G06K 15/00; H04N 1/32
(52) U.S. Cl. ...................... 358/1.14; 358/468; 358/435
(58) Field of Search ................................. 358/468, 442, 358/443, 444, 400, 405, 434, 114, 435–437

(56) References Cited

U.S. PATENT DOCUMENTS 4,516,122 A * 5/1985 Tomikawa ............... 340/825.5
4,816,911 A    3/1989 Kirsch et al. ............... 358/256
5,802,151 A * 9/1998 Bevill, Jr. et al. ....... 379/93.05

OTHER PUBLICATIONS

Facsimile Technology and Applications Handbook 2nd Ed 1992 pg 38, 1992.*

Japanese Published Application 276398 by Nakamura, 1994.*

* cited by examiner

Primary Examiner—Jerome Grant, II
(74) Attorney, Agent, or Firm—Oliff & Berridge, PLC

(57) ABSTRACT

A data communication system includes a first and a second information processing units. The second information processing unit transmits transmission requests to the second information processing unit and determines if there is any reception data from the second information processing unit at time intervals in which the value of a timer becomes zero. When such reception data does not exist, the timer is set to "A". When the reception data exists, the second information processing unit executes a data reception process and the timer is set to "B", which is smaller than "A". In addition, the second information processing unit determines the existence of transmission data to be transmitted to the second information processing unit. When such transmission data does not exist, the timer is set to "A". On the other hand, when such transmission data exists, the second information processing unit transmits the data to the second information processing unit and then sets the value of the timer to "B".

29 Claims, 8 Drawing Sheets

DATA COMMUNICATION SYSTEM FOR HIGH-SPEED DATA TRANSMISSION AND RECEPTION OPERATIONS AND METHOD FOR DOING THE SAME

CROSS REFERENCE TO RELATED APPLICATION

This application is based on and claims priority from Japanese Patent Application No. Hei-8-276718 filed on Oct. 18, 1996, the contents of which are incorporated herein by reference.

BACKGROUND OF THE INVENTION

1. Field of the Invention

The present invention relates to a data communication system that has a first information processing unit such as a computer and the like, and a second information processing unit such as a facsimile device with a printing function and the like. The present invention also relates to a data communication control method for such a data communication system. In particular, the present invention relates to the data communication system and the data communication control method wherein the second information processing unit transmits facsimile data and the like in response to transmission requests from the first information processing unit.

2. Description of Related Art

Multifunction peripheral devices, which have a plurality of functions and which act as peripheral equipment for computers, are now being developed. An example of such a multifunction peripheral device is a facsimile device that has a printing function. The facsimile device that has the printing function is configured to print data received from external devices such as a computer, a word processor and the like using its printer unit that usually prints facsimile data.

After receiving the facsimile data received from other facsimile devices and the like via a communication line, the facsimile device with the printing function prints facsimile data. In addition, the facsimile device with the printing function receives data transmitted by the computer and prints such data received from the computer.

Another type of multifunction peripheral device is the multifunction peripheral device that has expanded the functions of the facsimile device with the printing function. This type of multifunction peripheral device can send data received from a facsimile device or data read through a scanner to a computer and send facsimiles based on data transmitted by the computer. In this way, the computer can centrally control facsimile data receipt and transmission operations. The multifunction peripheral device is very useful in that it can transmit data read by a scanner to the computer, which can then edit the data, and subsequently receive edited data from the computer for facsimile transmission. In this way, with the multifunction peripheral device, facsimile data can be checked without the need for printing by displaying the data on the display of the computer and previously received facsimile data can be stored for subsequent usage.

The computer has main control over its communication operations with the multifunction peripheral device, which may be the facsimile device with the printing function. The computer transmits transmission requests to the multifunction peripheral device at predetermined time intervals. The computer subsequently receives data transmitted by the facsimile device in response to the transmission requests.

In addition, the computer checks for the existence of data to be transmitted to the multifunction peripheral device at predetermined intervals. When there is data that needs to be transmitted, the computer transmits the data to the multifunction peripheral device.

Meanwhile, for conventional data communication systems, the time interval at which the computer transmits the transmission requests is fixed regardless of the existence of data transmitted from the multifunction peripheral device. This does not pose a problem when the data to be transmitted from the multifunction peripheral device is, for example, status information data of the multifunction peripheral device which is small in size and whose content does not change very often. On the other hand, when a large amount of data such as facsimile data has been received by the multifunction peripheral device and needs to be transmitted to the computer, it takes a long time until the computer receives all the data and thus, high-speed operations cannot be performed.

The above problem is also holds true when transmitting data from the computer. That is, the interval for verifying the presence of data to be transmitted to the multifunction peripheral device is fixed regardless of the existence of the data to be transmitted. Therefore, the above setup hampers the high-speed transmission of data to the multifunction peripheral device.

Meanwhile, in parallel with performing data transmission and reception operations with the multifunction peripheral device, the computer also executes other operations and thus, transmission requests are transmitted at comparatively long intervals when there is no data to be received from the multifunction peripheral device. In the same way, when there is no data to be transmitted, the verification of the presence of data to be transmitted is preferably performed at comparatively long intervals.

SUMMARY OF THE INVENTION

In view of the foregoing problems in the prior art, it is a primary object of the present invention to provide a data communication system and a data communication control method for executing high-speed data reception operations. It is another object of the present invention to provide the data communication system and the data communication method for executing high-speed data transmission operations.

To achieve the aforementioned objects, one aspect of the present invention provides a data communication system that has a first information processing unit and a second information processing unit. The first information processing unit provides a transmission request to the second information processing unit. The second information processing unit receives the transmission request from the first information processing unit and sends response data to the first information processing unit in response to the transmission request. The first information processing unit provides a subsequent transmission request to the second information processing unit at a first time interval unless the second information processing unit sends the response data, and provides the subsequent transmission request to the second information processing unit at a second time interval shorter than the first time interval when the second information processing unit sends the response data.

In this way, the time needed for receiving data from the second information processing unit can be shortened when data is previously received. In this way, data reception operations can be performed at high-speed.

Preferably, the first information processing unit is further for determining if there is transmission data for the second information processing unit. The first information processing unit determines if there is transmission data at a third time interval when there is no transmission data during a previous determination operation and determines if there is transmission data at a fourth time interval shorter than the third time interval when there is transmission data during a previous determination operation.

In this way, the data transmission operations within the data communication system can be performed at high-speed.

Another aspect of the present invention provides a data communication method for facilitating communication between the first information processing unit and the second information processing unit. This method involves sending a transmission request from the first information processing unit to the second information processing unit, determining if the second information processing unit sends response data in response to the transmission request from the first information processing unit, sending a subsequent transmission request from the first information processing unit to the second information processing unit at a first time interval unless the second information processing unit sends the response data, and sending the subsequent transmission request from the first information processing unit to the second information processing unit at a second time interval shorter than the first time interval when the second information processing unit sends the response data.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENT

A preferred embodiment of the present invention is described hereinafter with reference to FIGS. 1 through 9B.

Figure 1:
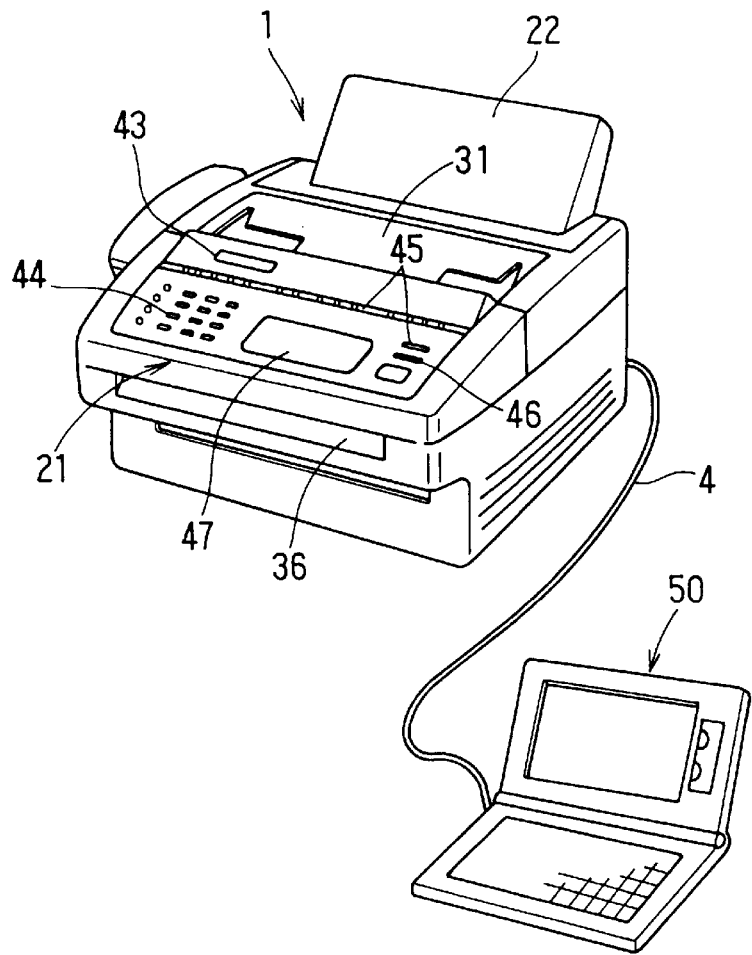
FIG. 1 is a perspective view illustrating a computer and a multifunction peripheral device of a data communication system according to a preferred embodiment of the present invention.
Figure 2:
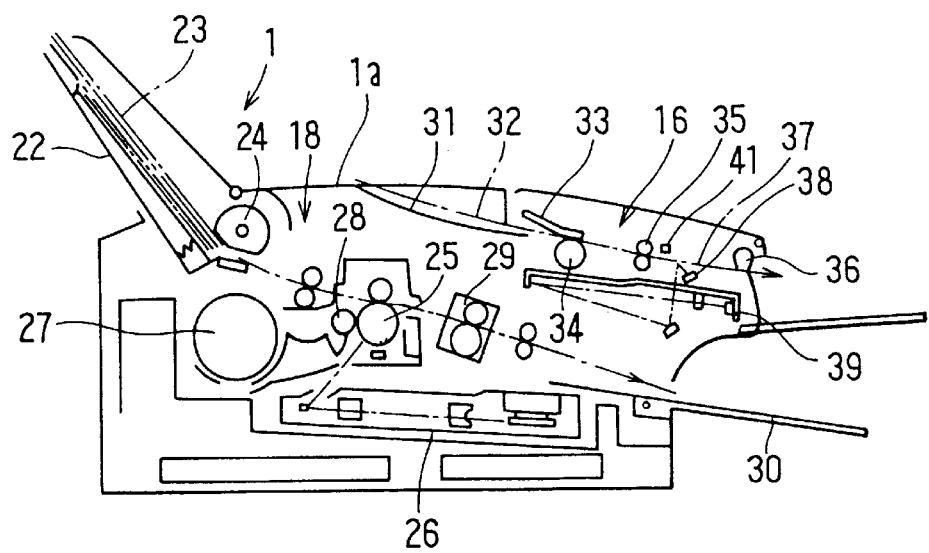
FIG. 2 is a schematic cross-sectional view of the multifunction peripheral device according to the preferred embodiment of the present invention.
Figure 3:
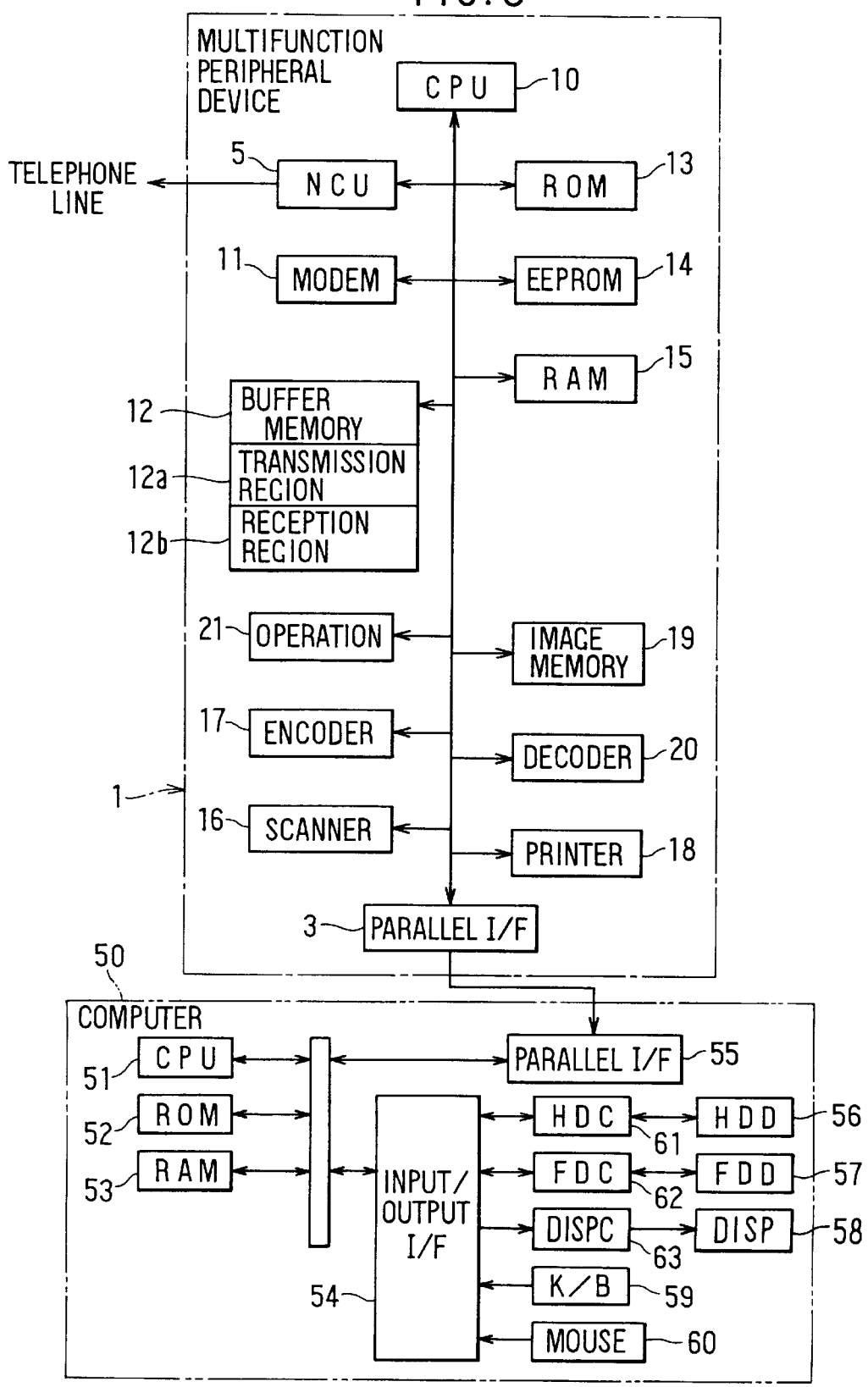
FIG. 3 is a block diagram illustrating the construction of hardware of the data communication system according to the preferred embodiment of the present invention.

As shown in FIG. 1, a data communication system of the present invention includes a computer 50 (also referred to as a first information processing unit), which may be a personal computer (PC) or the like, and a multifunction peripheral device 1 (also referred to as a second information processing unit). The multifunction peripheral device 1 has a scanner unit, a printer unit and a facsimile unit. As shown in FIGS. 1 to 3, the multifunction peripheral device 1 and the computer 50 are connected to each other via a parallel interface (I/F) 3, a cable 4 and a parallel I/F 55 so that they can communicate with each other.

The multifunction peripheral device 1 mainly includes a facsimile unit that performs facsimile operations, a printer unit 18 that prints data transmitted by the facsimile unit or the computer 50, and a scanner unit 16 that scans images and transmits the scanned image to the facsimile unit or the computer 50. The computer 50 generates operation command signals for controlling each unit of the multifunction peripheral device 1. The multifunction peripheral device 1 transmits facsimile data or scanned data to the computer 50. Moreover, the computer 50 transmits facsimile data to another facsimile device via the facsimile unit of the multifunction peripheral device 1.

The construction of each unit of the multifunction peripheral device 1 and the construction of the computer 50 are explained in detail hereinafter.

As shown in FIG. 3, the multifunction peripheral device 1 has an NCU (network controller unit) 5, a CPU 10, a modem 11, a buffer memory unit 12, a ROM unit 13, an EEPROM unit 14, a RAM unit 15, a scanner unit 16, an encoder 17, a printer unit 18, an image memory unit 19 and a decoder 20.

The NCU 5, which is a part of the facsimile unit, executes communication line control operations. The multifunction peripheral device 1 is connected to a telephone line via the NCU 5. The CPU 10 is connected via a bus line to the other various units of the multifunction peripheral device 1 and controls such various units to perform facsimile operations, that is, data communication operations following a predetermined communication control procedure.

The modem 11, which is a part of the facsimile unit, converts digital image signals into analog signals and transmits the analog signals to the outside via the telephone line and the NCU 5. The modem 11 also converts the analog image data signals transmitted from the outside via the telephone line and the NCU 5 into digital signals, and performs transmission and reception of various communication control signals.

The buffer memory unit 12 includes a plurality of regions such as a transmission buffer region 12a and a reception buffer region which are for temporarily storing encoded image data that are transmitted to and received from the outside via the telephone line.

The ROM unit 13 stores a control program for controlling the printer unit 18, the scanner unit 16 and the facsimile unit. The EEPROM unit 14 stores various data such as preset dial numbers, name of parties to be called and one-touch dial numbers. The contents of the EEPROM unit 14 remain intact even if the multifunction peripheral device 1 is deactuated. The RAM unit 15 temporarily stores data for various operations.

As shown in FIG. 2, the scanner unit 16 is an apparatus for reading images from a set of documents 32. The construction and operation of the scanner unit 16 is explained hereinafter. The documents 32 are placed on a document table 31 disposed at an upper side of the body 1a of the multifunction peripheral device 1. A separator 33 and a first carrier roller 34 separate each sheet of the document 32 and transport each sheet towards a pair of second carrier rollers 35. When one sheet of document 32 (which is set facing downwards in the present embodiment) is being transported from the pair of the second carrier rollers 35 towards a paper release roller 36, a light source 38 of a reading member 37 disposed between the rollers 35 and 36 irradiates the sheet of document 32. The resulting reflection light from the sheet of document 32 enters a reading head 39 (which may be a line image sensor and the like) via lenses and reflectors. In this way, the reading head 39 generates the image data of every sheet of document 32.

The encoder 17 shown in FIG. 3 encodes the image data read by the scanner unit 16. The facsimile unit externally transmits the encoded image data in sequence via the transmission region 12a of the buffer memory unit 12. The facsimile unit may also transmit the encoded image data immediately or at a designated time after the image data is temporarily stored in the image memory unit 19. This transmission function of the facsimile unit using the image memory unit 19 is very convenient in case the facsimile device that will receive the image data is busy or data is to be transmitted to a plurality of devices.

The facsimile unit transmits not only the image data read by the scanner unit 16 but also the data transmitted by and received from the computer 50. Image data read by the scanner unit 16 and processed by the computer 50, and text file generated by the computer 50 and converted to facsimile data are examples of data that are transmitted to the outside by the facsimile unit.

During normal data reception operations in which the facsimile unit stores data in real time, the facsimile unit receives image data transmitted from another facsimile device via the telephone line after executing a predetermined communication control operation with such facsimile device. The facsimile unit subsequently stores the received image data in the reception buffer region 12b of the buffer memory unit 12. Thereafter, the decoder 20 decodes (that is, expands) the image data, converts the image data into a dot image for printing page by page and stores the dot image in a bit image storage region of the image memory 19. The image data are expanded according to a predetermined resolution, and the resulting image data are transmitted to the printer unit 18 for printing page by page.

As shown in FIG. 1, an operation unit 21 of the facsimile unit has a display 43 (which may be a liquid crystal display or the like for displaying the operating condition of the facsimile unit and characters used for storing the names of the parties to be called), numeric keys 44, function keys 45, one-touch memory keys 46, abbreviation keys 47 and the like.

Here, the facsimile unit sends the received facsimile data to the computer 50 which may store the data as files. Furthermore, in the data communication system according to the present embodiment, the image data read by the scanner unit 16 could be transmitted by the facsimile unit to the computer 50 which may store the scanned data in a file. In turn, the computer 50 can process the stored image data and send the processed image data to the multifunction peripheral device 1 for printing or facsimile transmission image to other facsimile devices.

Next, the printer unit 18 which acts as an image generator is explained hereinafter. The printer unit 18 records data (e.g., image stored in the image memory 19, data received by the facsimile unit, data transmitted by the computer 50 and stored in the image memory unit 19, etc.) as hard copy on recording paper.

In other words, the image data received from the computer 50 is temporarily stored in the image memory unit 19. The image data may then be printed by the printer unit 18 with the CPU 10 controlling these data input/output and storage processes.

Details of the construction of the printer unit 18 are explained hereinafter with reference to FIG. 2. A paper supply cassette 22 is provided at a rear portion of the body 1a of the multifunction peripheral device 1. Recording paper 23 in the paper supply cassette 22 is supplied toward a photoreceptor drum 25. Next, a light scanning unit 26 projects laser light scanning rays on the photoreceptor drum 25 to generate a latent image on the same drum 25. The latent image is developed by using toner provided by a toner cartridge 27 and a developing unit 28 and is then copied on the recording paper 23. The recording paper 23 subsequently passes through a fixing unit 29, which includes a heating roller and pressure roller and which fixes the image. The recording paper 23 then goes to a delivery tray 30. In this way, the printer unit 18 of the present embodiment is an electrostatic electronic image recording type printer. It must be noted that a thermal-type printer and the like that prints images on heat sensitive paper may also be used as the printer unit 18.

Meanwhile, as shown in FIG. 3, the computer 50, which is the first information processing unit, includes a CPU 51, a ROM unit 52, a RAM unit 53, an input/output I/F 54 and a two-way parallel I/F 55. The CPU 51 includes a microprocessor and the like. The ROM unit 52 is for storing control programs and the like. The RAM unit 53 is for storing various data including image data read by the scanner unit 16 of the multifunction peripheral device 1. The input/output I/F 54 has input/output ports while the two-way parallel I/F 55 also has input/output ports for communicating with the multifunction peripheral device 1.

The computer 50 further includes a hard disk drive (HDD) 56, a floppy disk drive (FDD) 57, a display (which may be a CRT) 58, a keyboard 59 and a mouse 60, all of which are connected to the input/output I/F 54. The hard disk drive 56, the floppy disk drive 57 and the display 58 are connected to the input/output I/F 54 via a hard disk drive controller (HDC) 61, a floppy disk drive controller (FDC) 62 and a display controller (DISPC)63, respectively.

The parallel I/F 3 and the parallel I/F 55 are two-way communication I/F that facilitate communication between the computer 50 and the multifunction peripheral device 1. Through the parallel I/F 3 and the parallel I/F 55, the computer 50 controls the scanner unit 16 to read data, the printer unit 18 to generate the image and the facsimile unit to receive and transmit data via the NCU 5 and the like.

Figure 4:
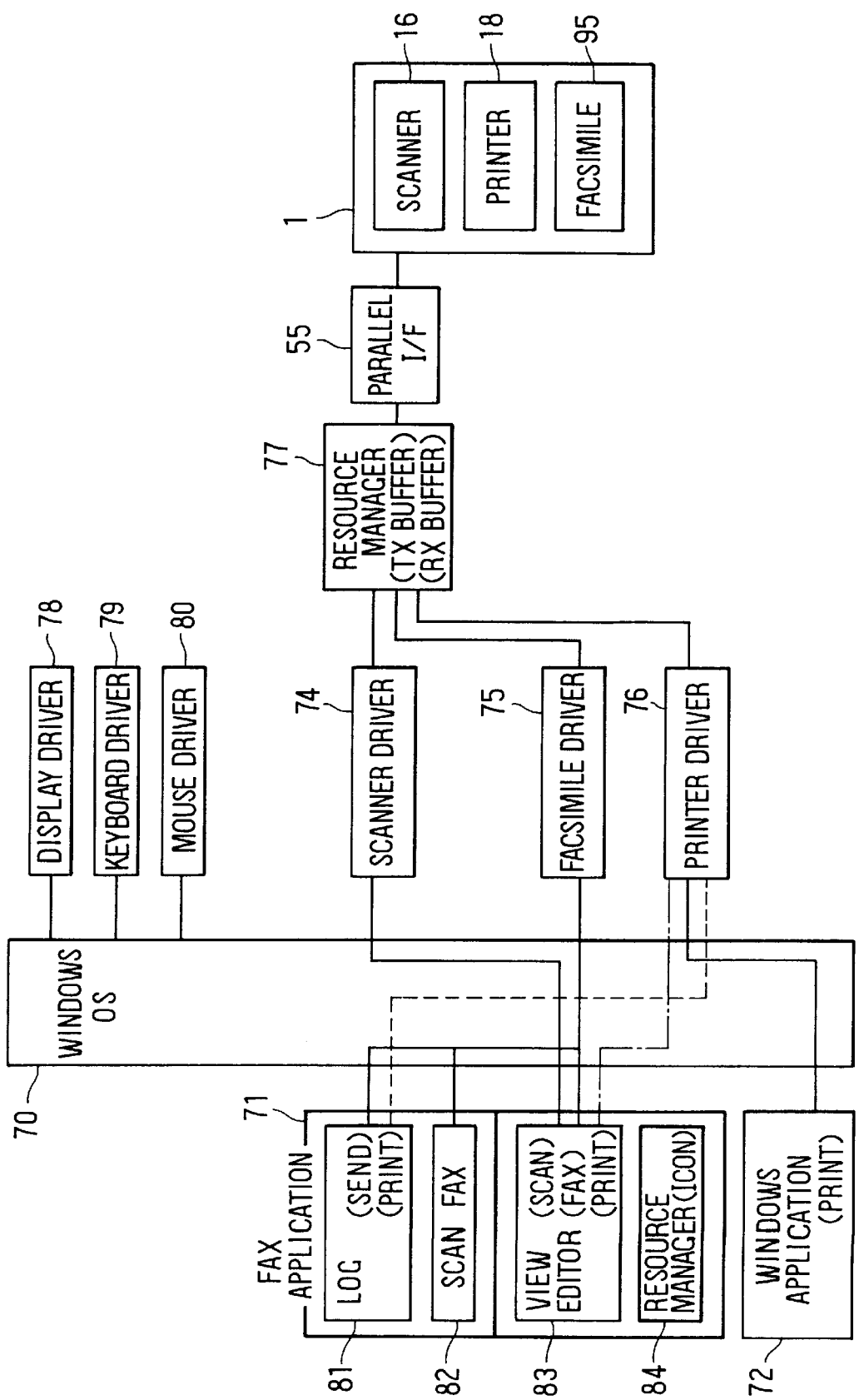
FIG. 4 is a block diagram illustrating the construction of software of the data communication system according to the preferred embodiment of the present invention.

With the hardware construction of the data communication system of the present invention explained in the above, the software of the data communication system will be explained hereinafter with reference to FIG. 4. In the present embodiment, as shown in FIG. 4, the operating system 70 of the computer 50 is the WINDOWS operating system. A FAX application program 71 for implementing the scanning, printing and facsimile functions of the multifunction peripheral device 1 and general application programs 72 such as word processing software run on the OS 70. These application programs and other programs such as drivers and the like are installed (stored) in the HDD 56 and the like beforehand with the CPU 51 executing these programs to implement the various operations.

The FAX application program 71 is an application program of the multifunction peripheral device 1 that enables the computer 50 to operate the multifunction peripheral device 1 as a facsimile device.

When the FAX application program 71 is in operation, buttons such as a log button 81, a scan fax button 82 and the like for implementing the various operations of the multifunction peripheral device 1 are displayed on the display 58. These operations are executed by clicking the respective buttons displayed on the display 58. For example, when the log button 81 is clicked, a log manager program is actuated. The log manager program manages transmission and reception record of the facsimile data and displays such transmission and reception record on the display 58. When the transmission and reception record is displayed on the display 58, a user can designate a specified transmission file and the like and click a "send" command icon displayed on the display 58 to transmit such file again.

When the "send" command is selected, the log manager program provides the name of the selected transmission file and a facsimile transmission command to a facsimile driver program 75. After receiving the facsimile transmission command, the facsimile driver program 75 transmits the data for facsimile transmission to the multifunction peripheral device 1 via a resource manager program 77. The facsimile driver program 75 transmits the data for facsimile transmission together with other various control signals (that is, control signals for implementing the facsimile transmission) that include a start signal for the facsimile transmission operation.

When the log manager program is in operation and a "print" command is selected, the transmission and reception record is printed by the multifunction peripheral device 1. In this case, the log manager program provides the name of the file to be printed and the print command to a printer driver program 76. The printer driver program 76 transmits various control signals (that is, control signals necessary for print operations) including print data and a print start signal to the multifunction peripheral device 1 via the resource manager program 77.

Furthermore, the log manager program may be actuated automatically when, for example, the facsimile driver program 75 indicates the storage of newly-received data with the log manager program displaying the data reception record and the like on the display 58.

When the scan fax button 82 is clicked, the facsimile driver program 75 sends a document scan command to the scanner unit 16 of the multifunction peripheral device 1 via the resource manager program 77. Accordingly, the document 32 provided on the document table 31 of the multifunction peripheral device 1 is carried by the carrier rollers 34 and 35 and is scanned by the reading head 39. The multifunction peripheral device 1 then sends the scanned data to the facsimile driver program 75 via the resource manager program 77. Thereafter, the facsimile driver program 75 provides the transmission record information to the log manager program and then sends the scanned data to the facsimile unit 95 of the multifunction peripheral device 1 via the resource manager program 77. In this way, the facsimile unit 95 of the multifunction peripheral device 1 performs the facsimile transmission of the scanned data.

The FAX application program 71 also facilitates the facsimile transmission of revised image data that is displayed on the display 58 of the computer 50 and scanned through the scanner unit 16 and the facsimile transmission of files stored in the HDD 56 and the like of the computer 50.

A view editor program 83 for implementing the above-described functions is provided in the FAX application program 71. Aside from the FAX application program 71, the view editor program 83 can also be activated by other application programs. Furthermore, the view editor program 83 activates when a file (that is, a file that stores data received via the facsimile unit 95 or data read by the scanner unit 16) having specified file extension is opened.

In this way, the view editor program 83 is for storing data received by the facsimile unit 95 or data scanned by the scanner unit 16 in the computer 50 and for displaying such data on the display 58. After displaying the data, the view editor program 83 can be used to edit the image data by deleting parts of the image data, adding text, and the like.

Aside from opening a file that has the predetermined file extension, the view editor program 83 may also be activated by placing a document 32 on the document table 31 of the multifunction peripheral device 1. Furthermore, the view editor program 83 can also be activated by clicking a view editor program icon displayed on the display 58. At any rate, when the view editor program 83 is activated, a menu is displayed on the display 58 from which a user can select a command from among those displayed. For example, the menu includes a FAX button and when this FAX button is clicked, a scan setting window is displayed. The scan setting window enables the setting of scanning condition such as resolution, scanning size and the like.

Therefore, after setting the suitable scanning conditions on the scan setting window, the user may click a start button in the scan setting window to make the view editor program 83 send scanning condition information and a transmission request for the scan start command to the facsimile driver program 75. Then, the facsimile driver program 75 transmits the scanning condition and the scan start command to the multifunction peripheral device 1 via the resource manager program 77.

After the multifunction peripheral device 1 receives the scanning conditions and the scan start command, its scanner unit 16 performs the scanning operation based on designated scanning conditions and the multifunction peripheral device 1 sends the scanned data to the facsimile driver program 75 via the resource manager program 77. Thereafter, the facsimile driver program 75 stores the data in the RAM 53. Thereafter, the facsimile driver program 75 informs the view editor program 83 of the receipt of the read data (scanned data) and hands over control of the data to the view editor program 83 before terminating its own operations. In response, the view editor program 83 displays the scan data stored in the RAM 53 on the display 58 and superimposes a display of the setting conditions of the facsimile transmission on such display of the scan data. In this way, the user may designate where to send the facsimile transmission on the setting screen. When the user clicks the start button, the view editor program 83 provides the scan data as facsimile transmission data and the transmission request for starting facsimile transmission to the facsimile driver program 75. After providing the transmission status information to the log manager program, the facsimile driver program 75 sends the aforementioned scan data to the facsimile unit 95 of the multifunction peripheral device 1 via the resource manager program 77. Thereafter, the facsimile unit 95 of the multifunction peripheral device 1 executes the facsimile transmission of the scanned data.

While the facsimile driver program 75 sends signals for scanning a document and for requesting the transmission of scan data when the FAX button or the scan FAX button 82 is clicked, these functions may also be executed by other programs. For example, the scanner driver program 74 may also send signals for scanning a document and for requesting the transmission of the scanned data.

When the scan button is selected from the menu of the view editor program 83, the scanner unit 16 of the multifunction peripheral device 1 performs the scanning operation based on the command from the scanner driver program 74. The scanned data are displayed on the window screen of the view editor program 83 in the same way as in the case of the facsimile transmission. When the user selects, for example, the storage of data in the HDD 56, the view editor program 83 retrieves the scan data stored in the RAM 53 and stored the scan data in the HDD 56 under a suitable filename.

The printer driver program 76 is activated when the print button is selected from among the menu of the view editor program 83. The printer driver program 76 controls the printer unit 18 of the multifunction peripheral device 1 to print the image data on recording paper.

Meanwhile, when a general application program 72 such as word processing software and the like is activated, selection of a command such as print and the like in such application program 72 results in the activation of the printer driver program 76 with the display of a screen for setting resolution, paper size, contrast and the like and for executing the start command of the printing operation. That is, by selecting a print command in the application program 72, the printing operation is performed via the printer driver program 76.

In general, the method of access of the computer 50 with respect to the scanner unit 16, the printer unit 18 or the facsimile unit 95 varies depending on the hardware construction of the scanner unit 16, the printer unit 18, the facsimile unit 95 or the computer 50 itself. In this way, it will be troublesome to adjust access methods of the application programs 71 and 72 to suit various hardware. Accordingly, the respective driver programs 74, 75 and 76 are disposed between the application programs 71 and 72 and the multifunction peripheral device 1 and the access methods from the application programs 71 and 72 are standardized. At the same time, the driver programs 74, 75 and 76 are set to deal with changes in hardware, operating systems and the like.

Similarly, a display driver program 78 for controlling the display 58, a keyboard driver program 79 for controlling the keyboard 59 and a mouse driver program 80 for controlling the mouse 60 work on the OS 70.

In the present embodiment, the resource manager program 77 is provided for supervising two-way data communication between the above-described driving programs 74, 75 and 76 and the multifunction peripheral device 1. The resource manager program 77 activates when the OS 70 is activated. If the resource manager program 77 is inactive (that is, closed) at the time the driver programs 74–76 is activated, the driver programs 74–76 automatically activate the resource manager program 77. After the activation of the resource manager program 77, an icon 84 indicating the resource manager program 77 is displayed on the display 58. When the operation of the resource manager program 77 needs to be stopped temporarily, a user may click the icon 84 to terminate the operation of the resource manager.

Meanwhile, both the scanner driver program 74 and the printer driver program 76 may be activated even if the FAX application program 71 is inactive. For example, the respective driver programs are activated when "print" and "scan" commands are generated from the view editor program 83 or an application 72 such as a word processing application or the like. In case the resource manager program 77 is inactive, the respective driver programs activate the resource manager program 77 and secure transmission and reception buffers for facilitating data communication with the multifunction peripheral device 1. The FAX application program 71 and the facsimile driver program 75 are usually active and thus, the resource manager program 77 is also usually active. That is, the resource manager program 77 needs to remain ready to receive data at any time because it is impossible to know when the multifunction peripheral device 1 will transmit the facsimile data received from other facsimile devices and the like to the computer 50.

The scanner driver program 74, the facsimile driver program 75 and the printer driver program 76 may access the resource manager program 77. The resource manager program 77 receives control data or the like from the respective driver programs 74–76 and sends such data in data packets to the multifunction peripheral device 1 to identify the driver program from which the data is coming from. In addition, the resource manager program 77 also delivers the data packet transmitted from the multifunction peripheral device 1 to the respective driver. In this way, control operations based on the transmitted and received data are performed by the respective driver programs and the multifunction peripheral device.

Through its execution of the resource manager program 77, the CPU 51 of the computer 50 acts as a reception and transmission controller for principally controlling communication operations between the computer 50 and the multifunction peripheral device 1. Accordingly, the CPU 51 transmits transmission requests from the computer 50 to the multifunction peripheral device 1 at a predetermined interval. In addition, the CPU 51 receives data sent by the CPU 10, which acts as the transmission controller of the multifunction peripheral device 1, to the computer 50 in response to the transmission requests.

Regarding the transmission of data from the computer 50, each driver program generates the transmission data and sends the transmission request to the resource manager program 77. When there is data that needs to be transmitted, the resource manager program 77 transmits such data to the multifunction peripheral device 1.

If the interval for transmitting the transmission requests is set to be constant regardless of the existence of data to be received from the multifunction peripheral device 1, the computer 50 will not be able to perform high-speed operations when there is a large amount of data such as facsimile data to be received.

Moreover, regarding the transmission of data from the computer 50, if the interval for verifying the existence of data to be transmitted is set to be constant regardless of the existence of such transmission data, the computer 50 will not be able to perform high-speed operations when transmitting print data to the multifunction peripheral device 1.

Because the computer 50 executes processes other than the aforementioned data transmission and reception processes, the interval for transmitting the transmission requests is preferably long enough when there is no data to be received from the multifunction peripheral device 1. In the same way, when there is no data to be transmitted, the interval for verifying the existence of data to be transmitted is preferably set long enough to allocate time for executing the other processes.

Accordingly, the data communication system according to the present invention intends to solve the aforementioned problems by shortening the transmission interval of the transmission requests to receive data within a short period of time and by shortening the interval for verifying the existence of transmission data when there is data to be transmitted to transmit data within a short period of time.

Figure 5:
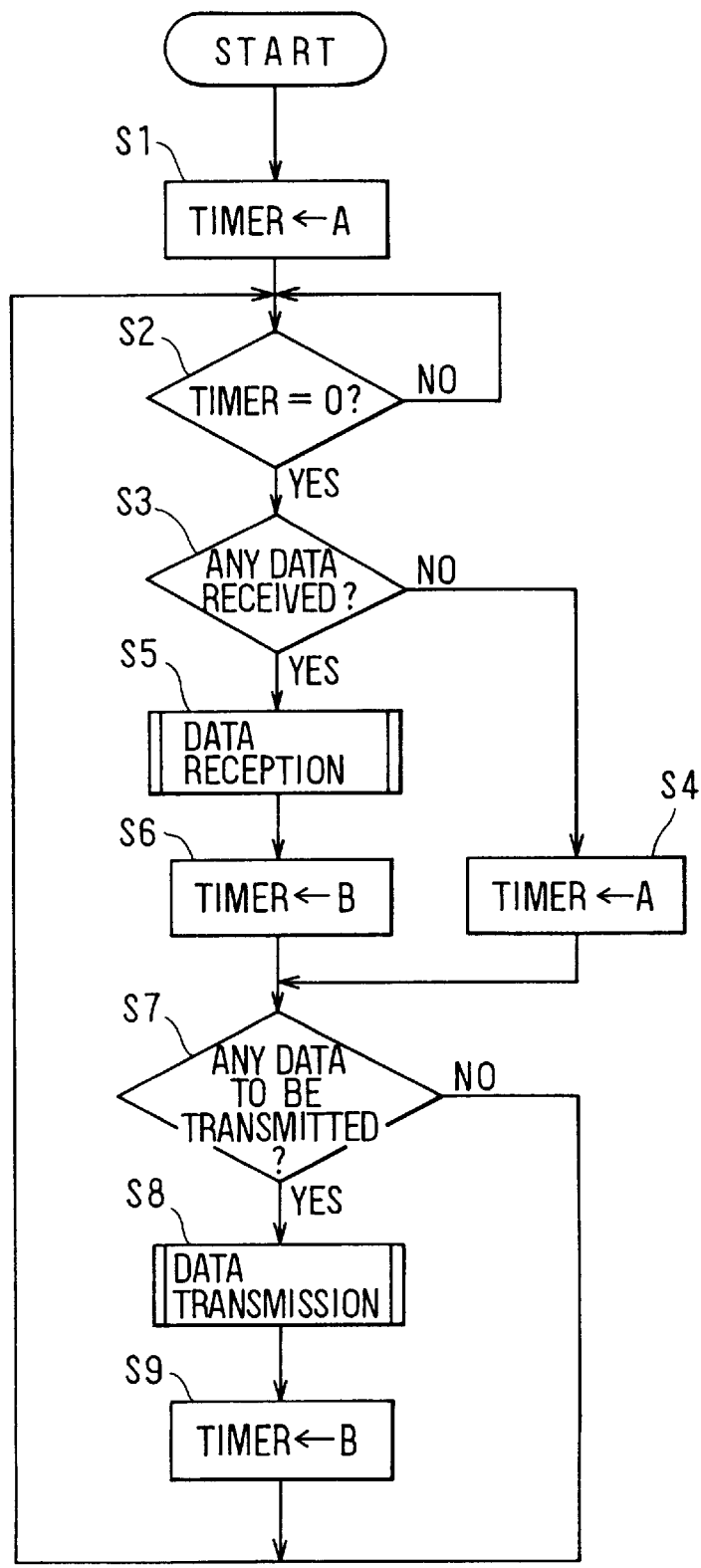
FIG. 5 is a flowchart of a main process executed by a resource manager program of the computer according to the preferred embodiment of the present invention.
Figure 6A:
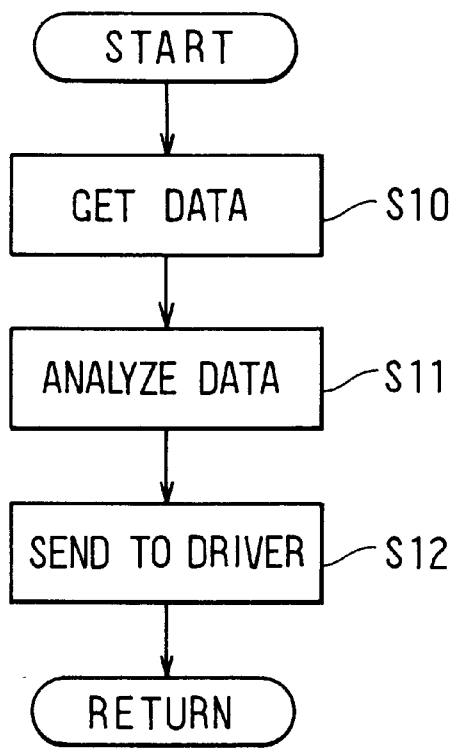
FIGS. 6A and 6B are flowcharts of data reception and transmission processes executed by the resource manager program according to the preferred embodiment of the present invention.
Figure 6B:
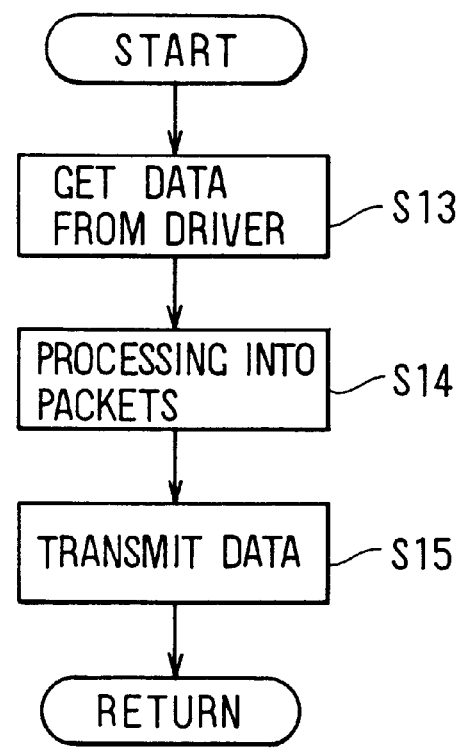

Hereinafter, the transmission and the reception processes as performed by the resource manager program 77 are explained with reference to flowcharts shown in FIGS. 5, 6A and 6B and timing charts shown in FIGS. 7A to 9B.

After the resource manager program 77 is activated, step S1 activates a timer (which may be based on an internal clock of the computer 50) and sets the initial value of the timer to "A". The timer counts down from its initially set value and is controlled by the OS 70 for switching tasks between the resource manager program 77 and other programs being executed.

That is, after the resource manager program 77 sets the timer to a predetermined value, the OS 70 temporarily stops the execution of the resource manager program 77 and executes other programs that are being run in parallel with the resource manager program 77. Then, when the timer value becomes zero, the OS 70 again executes the resource manager program 77.

To put it more concretely, the resource manager program 77 does not resume its operations until the timer value becomes zero; that is, the operations of the resource manager program 77 remain suspended while step S2 is still giving a negative output. When the value of the timer becomes zero, that is, when step S2 gives a positive output, step S3 transmits the transmission request to the multifunction peripheral device 1 in order to determine whether or not there is reception data to be received from the multifunction peripheral device 1. When step S3 gives a negative output, that is, when step S3 determines that there is no reception data from the multifunction peripheral device 1 in response to the transmission request, control goes to step S4 which sets the timer value to "A" again. In order for the computer 50 to determine the existence of the reception data, the multifunction peripheral device 1 may transmit a message to the computer 50 that indicates that there is no data with the computer 50 being set to determine such message. It may also be that the computer 50 is arranged to wait for a response from the multifunction peripheral device 1 for a predetermined time period. In this arrangement, the computer 50 determines that there is no data from the multifunction peripheral device 1 when it does not receive any data within the predetermined time period. Here, in the present embodiment, the computer 50 determines the existence of reception data by checking port signals of the parallel I/F 55.

Next, when step S7 checks for the presence of transmission data from any of the driver programs 74–76 and determines that there is no such transmission data (that is, step S7 gives a negative output), control goes back to step S2 with the value of the timer set to "A". The execution of this process will remain suspended until the timer value becomes zero. Therefore, when there is no reception data and no transmission data, the resource manager program 77 performs transmission of the transmission requests to the multifunction peripheral device 1 and the determination of the existence of transmission data from the driver programs 74–76 at every time interval "A". It must be noted that the determination of the existence of transmission data from the driver programs 74–76 may be executed using messages.

Meanwhile, when there is reception data from the multifunction peripheral device 1, that is, when step S3 gives a positive output, control goes to step S5 which executes a data reception process. As shown in the flowchart of FIG. 6A, in this data reception process, step S10 receives data, step S11 determines to which driver program the data is intended for based on identification information contained in the data received and step S12 sends the data received to the corresponding driver.

After the completion of the data reception process, control goes to step S6 that sets the value of the timer to "B". It must be noted that the timer value "B" is smaller than the timer value "A". That is, for example, the timer value "A" may indicate a time period of 0.5 to 1 second while the timer value "B" may indicate a time period of 0.1 to 0.2 seconds. Step S7 determines if there is any data to be transmitted from any of the driver programs 74–76. When there is no transmission data, that is, when step S7 gives a negative output, control returns to step S2 which suspends the execution of this process of the resource manager program 77 until the timer, whose timer value of "B" is set in step S6, becomes zero.

Therefore, when reception data exists and there is no transmission data, the time interval for transmitting the transmission requests to the multifunction peripheral device 1 is set to "B". Because the timer value "B" is set to be smaller than the timer value of "A", the interval for transmitting transmission request to the multifunction peripheral device 1 when there is data received from the same peripheral device 1 is shorter than the interval when there is no data received.

When there is transmission data from a driver program, that is, when step S7 gives a positive output, control goes to step S8 which executes a data transmission process. As shown in FIG. 6B, in this data transmission process, step S13 receives the data from the corresponding driver program, step S14 executes a packeting process for processing the data into packets by adding identification information to the data and the like, and step S15 transmits the data packet to the multifunction peripheral device 1. Print data, data for facsimile transmission or the like are examples of transmission data from the drivers 74–76.

After the execution of the above-described transmission process, step S9 sets the value of the timer to "B" and control then goes to step S2 which suspends this process of the resource manager program 77 until the value of the timer becomes zero. That is, when no reception data exists and there is transmission data, the time interval for determining the existence of the transmission data is set to be shorter than the case when there is no transmission data. In this way, overall processing speed of the computer 50 becomes faster.

Figure 7A:
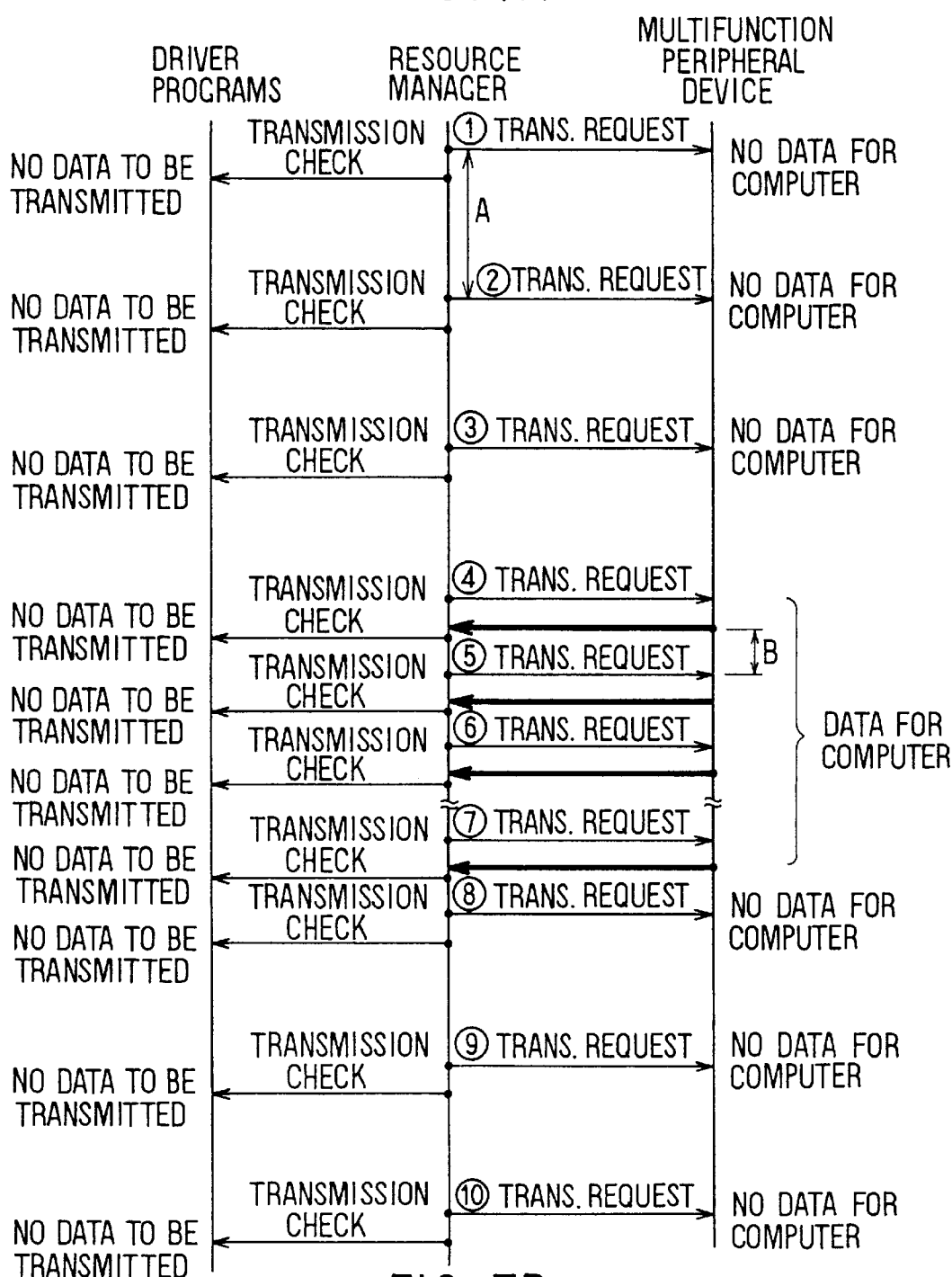
FIGS. 7A and 7B are timing charts illustrating data reception operations executed of the resource manager program according to the preferred embodiment of the present invention.
Figure 7B:
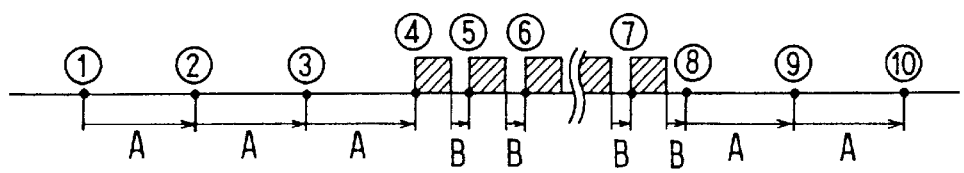

Next, concrete examples of the data communication control process of the data communication system according to the present embodiment of the present invention are explained with reference to the timing charts of FIGS. 7A through 9B. It must be noted here that the resource manager program's transmission of the data received from the multifunction peripheral device 1 to the respective drivers 74–76 has been omitted and is not shown in FIGS. 7A, 8A and 9A. FIG. 7A illustrates the timing in which the resource manager program 77 transmits the transmission request to the multifunction peripheral device 1 and determines if there is any data to be received (corresponding to step S3) and the timing for sending transmission checks (corresponding to step S7) in which the resource manager program 77 determines the existence of transmission data from the driver programs 74–76. FIG. 7B illustrates the time intervals for performing the transmission request/data reception determination operation of the resource manager program 77 which is for determining the presence of data to be received from the multifunction peripheral device 1. In this example, for purposes of simplicity, transmission data to be sent from the computer 50 (more concretely, driver programs 74–76) to the multifunction peripheral device 1 are not shown in FIGS. 7A and 7B, and the transmission check operations are not illustrated in FIG. 7B.

When the timer value of the aforementioned timer becomes zero, the resource manager program 77 performs the transmission request/data reception determination and the transmission determination at timings ① through ③. Here, because there is no data received and there is no data to be transmitted, the time interval until the execution of the subsequent data reception determination operation and the subsequent transmission determination operation will be "A". In FIG. 7B, the timing at which the reception/determination operation is executed (that is, the timing at which the timer value becomes zero) are indicated as black spots. As shown in FIG. 7B, the intervals between data reception determination operations ① through ③ are longer than the intervals between data reception determination operations ④ through ⑦.

Because of the reception of data from the multifunction peripheral device 1 in ④ through ⑦, the timer is set to "B" and thus, the time interval up to a subsequent reception determination operation becomes the sum of the time period necessary for performing the data reception process and the time period indicated by timer value "B". In this way, the time interval between subsequent data reception determination operations when there is data received from the multifunction peripheral device 1 becomes shorter than the time interval when there is no data received from the multifunction peripheral device. The slanted lines in FIG. 7B indicate the time period in which the resource manager program 77 performs the data reception operation.

Meanwhile, the interval between the timing ⑦ and the timing ⑧ is short because of the reception of data during the data reception determination operation at the timing ⑦. On the other hand, no reception data is received in the data reception determination operation at the timing ⑧, and thus, the interval between the timing ⑧ to a subsequent timing ⑨ is longer than the time interval between the timing ⑦ and the timing ⑧.

Figure 8A:
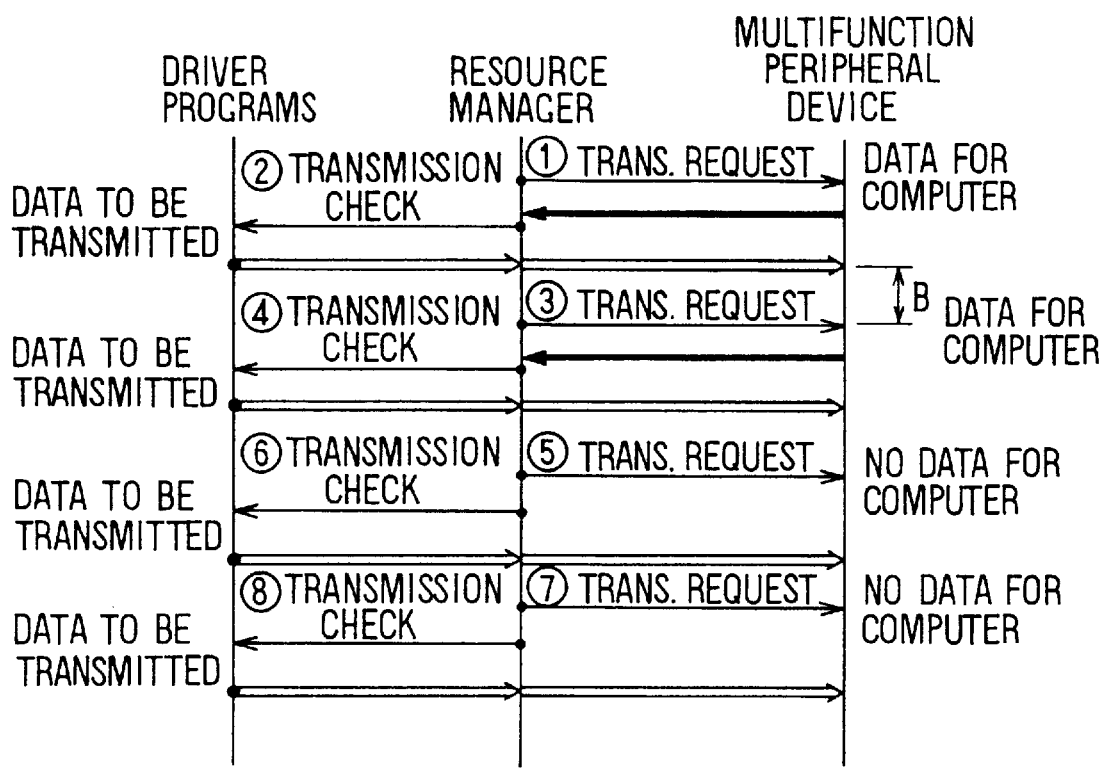
FIGS. 8A, 8B, 9A and 9B are timing charts illustrating data reception and data transmission operations of the resource manager program according to the preferred embodiment of the present invention.
Figure 8B:
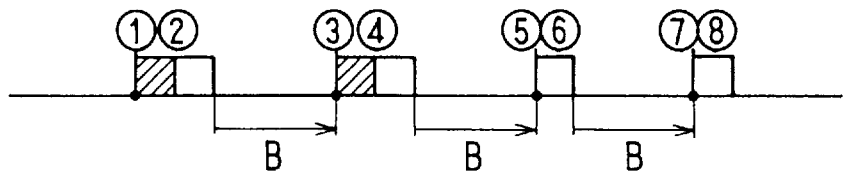
Figure 9A:
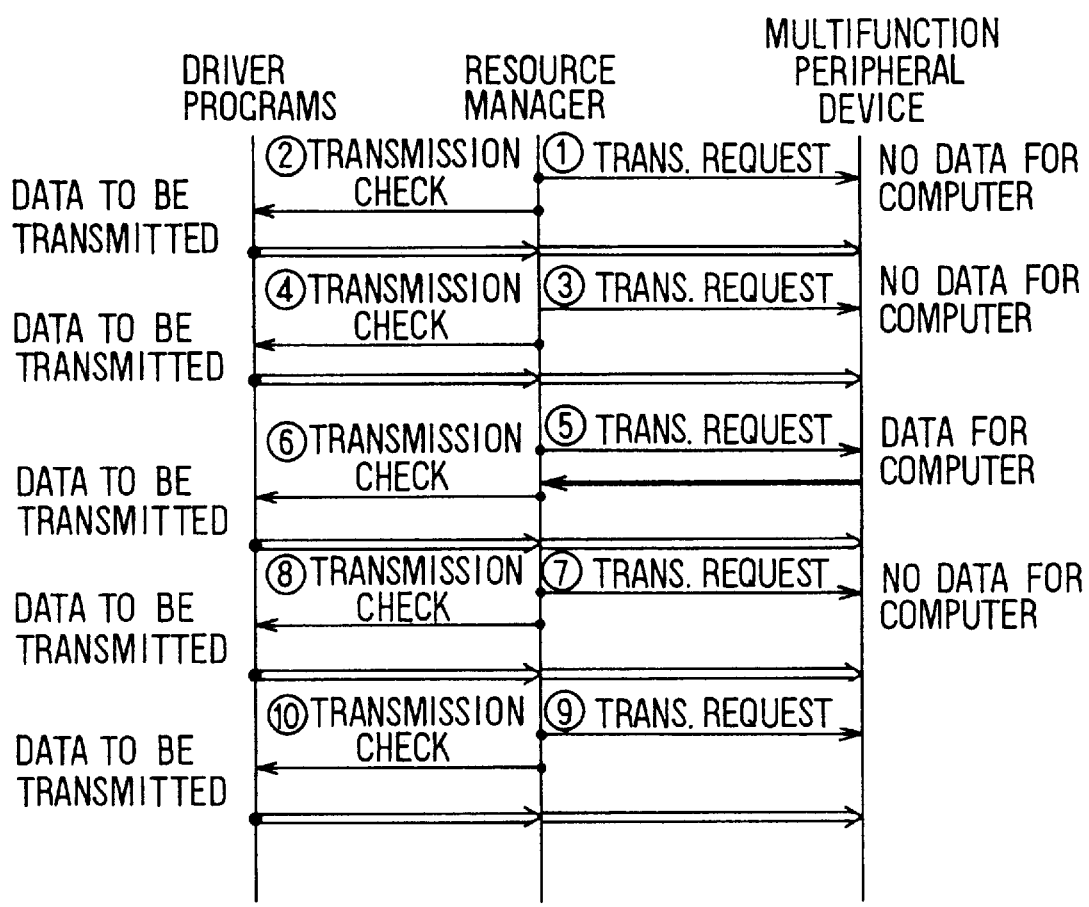
Figure 9B:
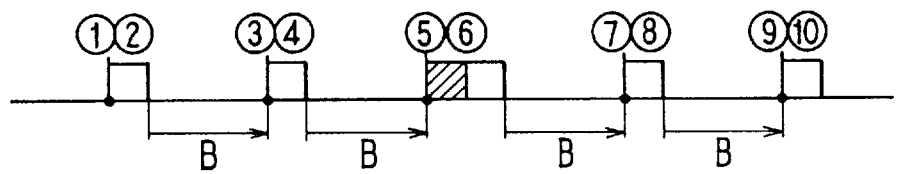

Next, FIGS. 8A and 8B illustrate a case in which there is reception data from the multifunction peripheral device 1 and there is transmission data from the driver.

Because the resource manager program 77 receives data from the multifunction peripheral device 1 at the timing ①, the timer value is set to "B". Thereafter, because there is transmission data from the driver program at the timing ②, the resource manager program 77 receives transmission data from the driver program and the timer value is again set to "B". In this way, the time interval between the completion of the transmission process of the timing ② and the timing ③ will be "B" which is shorter than the time interval "A". It must be noted that the time interval "B" is shown to be larger in FIG. 8B than in FIG. 7B to clearly indicate the time interval "B".

At the timing ③ and the timing ④, because both the reception data from the multifunction peripheral device 1 and the transmission data from the computer 50 (that is, the driver) exist, the time interval from the completion of the data transmission process of the timing ④ to the data determination process of the timing ⑤ is time interval "B".

In the data reception determination process at the timing ⑤, because there is no reception data from the multifunction peripheral device 1, the resource manager 77 temporarily sets the timer value to "A". However, because there is transmission data from the computer 50 at the timing ⑥, the timer value is set to "B" and thus, the interval from the completion of the transmission process of the timing ⑥ to the data reception determination operation of the timing ⑦ is set to "B"f.

In this way, when there is data to be transmitted, the time interval up to the next determination process is shortened, and thus, the computer 50 can perform transmission operations faster.

FIG. 9 illustrates another example in which there is reception data from the multifunction peripheral device 1 and there is transmission data from the driver program. In the same way as in the previous examples, the data transmission process and data reception process can both be executed at shortened time intervals.

As explained above, when there is no reception data and no transmission data, the transmission of the transmission requests and the reception determination are set to a reasonably long time interval "A". Also, the execution of the process of the resource manager program 77 is suspended until the timer value becomes zero and thus, with the process of the resource manager program 77 being suspended during such time interval, the other processes of the computer 50 can avail of enough CPU time.

On the other hand, when the reception data or the transmission data exists, the process of sending transmission requests and the data reception process are executed at shorter time intervals. In the same way, the verification of the presence of transmission data and the data transmission process are also executed at shorter time intervals. In this way, the data communication system of the present invention can perform high-speed data reception and data transmission operations.

The present invention having been described should not be limited to the disclosed embodiment, but it may be modified in many other ways without departing from the scope and the spirit of the invention.

For example, although the same timer is used for the data reception process and the data transmission process of the resource manager program 77, different timers may also be used for these processes. In this way, while the time values "A" and "B" are used for both transmission of transmission requests and the transmission checks, with the use of separate timers, the time interval for sending the transmission requests and the time interval for sending the transmission checks may be set to different values. Moreover, while the above embodiment is explained with reference to the multifunction peripheral device provided with a scanner function, a printer function and a facsimile function, the present invention is not limited to such peripheral device and may be applied to other data communication devices that execute digital data communication.

Furthermore, although the parallel I/F is used for data communication in the aforementioned data communication system, a serial I/F may also be employed.

Such changes and modifications are to be understood as being included with the scope of the present invention as defined by the appended claims.

What is claimed is:

1. A data communication system capable of communicating data bi-directionally between a first information processing unit and a second information processing unit, comprising:

a first information processing unit that provides a transmission request to determine whether there is data in the second information processing unit and that receives said data from said second information processing unit; and a second information processing unit that receives said transmission request provided by said first information processing unit and that sends said data to said first information processing unit in response to said transmission request when said second information processing unit contains said data, wherein said first information processing unit is further for repeatedly providing a subsequent transmission request to said second information processing unit at one of different first and second periodic time intervals depending on whether or not the first information processing unit receives said data, the first information processing unit repeatedly providing the subsequent transmission request to the second information processing unit at the first periodic time interval when said first information processing unit does not receive said data, the first information processing unit repeatedly providing said subsequent transmission request to said second information processing unit at the second periodic time interval, which is shorter than said first periodic time interval, when said first information processing unit receives said data.

2. A data communication system according to claim 1, said system further comprising a third information processing unit for generating transmission data and for sending said transmission data to said first information processing unit;

wherein:

said first information processing unit is further for determining if said third information processing unit has generated said transmission data, for receiving said transmission data generated by said third information processing unit, and for sending said transmission data to said second information processing unit, said first information processing unit being for subsequently determining if said third information processing unit has generated said transmission data at a third time interval unless said third information processing unit has previously generated said transmission data and for subsequently determining if said third information processing unit has generated said transmission data at a fourth time interval shorter than said third time interval when said third information processing unit has previously generated said transmission data.

3. A data communication system according to claim 2, wherein said first information processing unit and said third information processing unit are integral.

4. A data communication system according to claim 3, wherein:

said first time interval and said third time interval are equal; and said second time interval and said fourth time interval are equal.

5. A data communication system according to claim 4, wherein:

said first information processing unit includes a control unit that is for executing a generation operation for generating said transmission request, a determination operation for determining if said third information processing unit has generated said transmission data, and a data processing operation, said control unit being for executing said generation operation and said determination operation in parallel with said data processing operation; and said second information processing unit includes an image scanning unit for scanning a document and an image generation unit that generates image data based on said document scanned by said image scanning unit.

6. A data communication system according to claim 5, wherein said second information processing unit further includes a facsimile unit for receiving facsimile data from the outside, said second information processing unit being for transmitting said facsimile data as said data to said first information processing unit.

7. A data communication system according to claim 6, wherein:

said first information processing unit is a computer; and said second information processing unit is a multifunction peripheral device which has a plurality of functional units for executing mutually different functions by exchanging data with said computer.

8. A data communication system according to claim 1, wherein said first information processing unit includes:

a request generating unit for providing said transmission request to said second information processing unit;

a transmission data generating unit for providing transmission data to said second information processing unit, and a determination unit for determining at a third time interval if said transmission data generating unit has generated said transmission data unless said transmission data generating unit has previously generated said transmission data and for subsequently determining at a fourth time interval shorter than said third time interval if said transmission data generating unit has generated said transmission data when said transmission data generating unit has previously generated said transmission data.

9. A data communication system according to claim 8, wherein:

said first time interval and said third time interval are equal; and said second time interval and said fourth time interval are equal.

10. A data communication system according to claim 9, wherein:

said first information processing unit further includes a control unit that is for executing a generation operation for activating said request generating unit, a determination operation for activating said determination unit, and a data processing operation, said control unit being for executing said generation operation and said determination operation in parallel with said data processing operation; and said second information processing unit includes an image scanning unit for scanning a document and an image generation unit that generates image data based on said document scanned by said image scanning unit.

11. A data communication system according to claim 10, wherein said second information processing unit further includes a facsimile unit for receiving facsimile data from the outside, said second information processing unit being for transmitting said facsimile data as said data to said first information processing unit.

12. A data communication system according to claim 11, wherein:
said first information processing unit is a computer; and
said second information processing unit is a multifunction peripheral device which has a plurality of functional units for executing mutually different functions by exchanging data with said computer.

13. A data communication system according to claim 1, wherein:
said second time interval starts from a completion of sending the data.

14. A computer program product for driving a computer to perform bi-directional communication operations with an information processing device, said computer program product comprising:
a computer usable medium having computer readable program code means embodied therein for causing said computer to communicate bi-directionally with an information processing device, said computer program product having:
computer readable program code means for causing said computer to send a transmission request to said information processing device to determine whether said information processing device contains data to be transmitted to said computer;
computer readable program code means for causing said computer to determine if said computer receives said data in response to said transmission request;
computer readable program code means for repeatedly causing said computer to send a subsequent transmission request to said information processing device at a first periodic time interval when said computer does not receive said data; and
computer readable program code means for repeatedly causing said computer to send said subsequent transmission request to said information processing device at a second periodic time interval, which is shorter than said first periodic time interval, when said computer receives said data;
such that the computer is repeatedly caused to send said subsequent transmission request at one of the different first and second periodic time intervals depending on whether or not the computer receives said data.

15. A computer program product according to claim 14, said product further comprising:
computer readable program code means for causing said computer to determine if there is transmission data to be sent to said information processing device at a third time interval;
computer readable program code means for causing said computer to send said transmission data to said information processing device when there is said transmission data; and
computer readable program code means for causing said computer to subsequently determine if there is said transmission data to be sent to said information processing device at a fourth time interval that is shorter than said third time interval when there is said transmission data.

16. A computer program product according to claim 14, said product further comprising:
computer readable program code means for causing said computer to initially set a third time interval to a first value;
computer readable program code means for causing said computer to determine if there is transmission data to be sent to said information processing device at said third time interval;
computer readable program code means for causing said computer to send said transmission data to said information processing device when there is said transmission data;
computer readable program code means for causing said computer to subsequently set said third time interval to a second value which is indicative of a shorter time interval than said third time interval when there is said transmission data; and
computer readable program code means for causing said computer to subsequently set said third time interval to said first value unless there is transmission data.

17. A computer for performing bi-directional communication operations with a multifunction peripheral device, said computer comprising:
an information processing unit that provides a transmission request to a multifunction peripheral device to determine whether said multifunction peripheral device contains data to be transmitted to said computer; and
a control unit for controlling said information processing unit,
wherein said information processing unit is further for repeatedly providing a subsequent transmission request to said multi function peripheral device at one of different first and second periodic time intervals depending on whether or not the information processing unit received said data, the information processing unit repeatedly providing the subsequent transmission request to the multifunction peripheral device at the first periodic time interval when said information processing unit does not receive said data, the information processing unit repeatedly providing said subsequent transmission request to the multifunction peripheral device at the second periodic time interval, which is shorter than said first periodic time interval, when said information processing unit receives said data.

18. A computer according to claim 17, said computer further comprising a data generating unit for generating transmission data and for sending said transmission data to said information processing unit;
wherein:
said information processing unit is further for determining if said data generating unit has generated said transmission data, for receiving said transmission data generated by said data generating unit, and for sending said transmission data to said multifunction peripheral device, said information processing unit being for subsequently determining if said data generating unit has generated said transmission data at a third time interval unless said data generating unit has previously generated said transmission data and for subsequently determining if said data generating unit has generated said transmission data at a fourth time interval shorter than said third time interval when said data generating unit has previously generated said transmission data.

19. A computer according to claim 18, wherein:
said first time interval and said third time interval are equal; and
said second time interval and said fourth time interval are equal.

20. A computer according to claim 17, wherein:
said information processing unit includes a supervision unit that is for executing a generation operation for generating said transmission request, a determination operation for determining if said data generating unit has generated said transmission data, and a data processing operation, said supervision unit being for executing said generation operation and said determination operation in parallel with said data processing operation.

21. A computer according to claim 17, wherein said information processing unit includes:

a request generating unit for providing said transmission request to said multifunction peripheral device;

a transmission data generating unit for providing transmission data to said multifunction peripheral device, and a determination unit for determining at a third time interval if said transmission data generating unit has generated said transmission data unless said transmission data generating unit has previously generated said transmission data and for subsequently determining at a fourth time interval shorter than said third time interval if said transmission data generating unit has generated said transmission data when said transmission data generating unit has previously generated said transmission data.

22. A method of communicating data bi-directionally between two communication devices, comprising the steps of:

checking whether data exists to be transmitted from a first communication device to a second communication device;

transmitting said data from said first communication device to said second communication device upon the existence of said data;

repeatedly checking whether other data exists to be transmitted from the first communication device to the second communication device at a first periodic time interval if no data has been transmitted; and repeatedly checking whether other data exists to be transmitted from the first communication device to the second communication device at a second periodic time interval, which is shorter than said first predetermined interval, if data has been transmitted.

23. A method of communicating data between two communication devices according to claim 22, further comprising the step of:

changing said second predetermined time interval to said first predetermined time interval when there is no another data.

24. A method of communicating data between two communication devices according to claim 22, wherein:

said second predetermined time interval starts from a completion of said transmitting step.

25. A data processing device for performing bi-directional communication operations with a peripheral device, said data processing device comprising:

an information processing unit that provides a transmission request to the peripheral device to determine whether said peripheral device contains data to be transmitted to said data processing device; and a control unit for controlling said information processing unit, wherein said information processing unit repeatedly provides a subsequent transmission request to said peripheral device at one of different first and second periodic time intervals depending on whether or not the information processing unit receives said data, the information processing unit repeatedly provides the subsequent transmission request to the peripheral device at the first periodic time interval when said information processing unit does not receive said data, the information processing unit repeatedly provides said subsequent transmission request to the peripheral device at the second periodic time interval, which is shorter than said first periodic time interval, when said information processing unit receives said data.

26. The data processing device according to claim 25, said data processing device further comprising a data generating unit for generating transmission data and for sending said transmission data to said information processing unit;

wherein:

said information processing unit determines if said data generating unit has generated said transmission data, receives said transmission data generated by said data generating unit, and sends said transmission data to said peripheral device, said information processing unit subsequently determines if said data generating unit has generated said transmission data, at a third time interval unless said data generating unit has previously generated said transmission data, and subsequently determines if said data generating unit has generated said transmission data, at a fourth time interval shorter than said third time interval, when said data generating unit has previously generated said transmission data.

27. The data processing device according to claim 26, wherein:

said first time interval and said third time interval are equal; and said second time interval and said fourth time interval are equal.

28. The data processing device according to claim 25, wherein:

said information processing unit includes a supervision unit that executes a generation operation that generates said transmission request, a determination operation that determines if said data generating unit has generated said transmission data, and a data processing operation, said supervision unit executes said generation operation and said determination operation in parallel with said data processing operation.

29. The data processing device according to claim 25, wherein said information processing unit includes:

a request generating unit that provides said transmission request to said peripheral device;

a transmission data generating unit that provides transmission data to said peripheral device; and a determination unit that determines at a third time interval if said transmission data generating unit has generated said transmission data, unless said transmission data generating unit has previously generated said transmission data, and that subsequently determines at a fourth time interval shorter than said third time interval if said transmission data generating unit has generated said transmission data, when said transmission data generating unit has previously generated said transmission data.

* * * * *